(12) United States Patent
Belghoul et al.

(10) Patent No.: US 9,832,686 B2
(45) Date of Patent: Nov. 28, 2017

(54) PROCEDURES FOR 3GPP CIRCUIT SWITCHED FALLBACK

(71) Applicant: Apple Inc., Cupertino, CA (US)

(72) Inventors: Farouk Belghoul, Campbell, CA (US); David Boettger, San Jose, CA (US); Krisztian Kiss, Hayward, CA (US); Dawei Zhang, Saratoga, CA (US); Tarik Tabet, Los Gatos, CA (US); Rafael L. Rivera-Barreto, Santa Clara, CA (US); Huarui Liang, Beijing (CN)

(73) Assignee: Apple Inc., Cupertino, CA (US)

( * ) Notice: Subject to any disclaimer, the term of this patent is extended or adjusted under 35 U.S.C. 154(b) by 177 days.

(21) Appl. No.: 14/791,687

(22) Filed: Jul. 6, 2015

(65) Prior Publication Data

US 2016/0007240 A1   Jan. 7, 2016

Related U.S. Application Data

(60) Provisional application No. 62/021,254, filed on Jul. 7, 2014.

(51) Int. Cl.
*H04L 12/28*   (2006.01)
*H04W 36/00*   (2009.01)
(Continued)

(52) U.S. Cl.
CPC ....... *H04W 36/0022* (2013.01); *H04W 36/14* (2013.01); *H04W 48/16* (2013.01);
(Continued)

(58) Field of Classification Search
CPC ..................................................... H04L 12/12
(Continued)

(56) References Cited

U.S. PATENT DOCUMENTS

2013/0070728 A1   3/2013   Umatt et al.
2013/0088983 A1*  4/2013   Pragada ............... H04W 16/14
                                                           370/252
(Continued)

FOREIGN PATENT DOCUMENTS

EP     2249607 A1    11/2010
WO     2013020000 A1   2/2013
(Continued)

OTHER PUBLICATIONS

International Search Report & Written Opinion, Application No. PCT/US2015/039216, dated Oct. 8, 2015, 13 pages.
(Continued)

*Primary Examiner* — Dang Ton
(74) *Attorney, Agent, or Firm* — Meyertons Hood Kivlin Kowert & Goetzel, P.C.; Jeffrey C. Hood

(57) ABSTRACT

Mobile devices, base stations, and/or relay stations may implement CSFB (circuit switched fallback) operations by using RRC (radio resource control) connection release and/or handover procedures. If the CSFB RAT (radio access technology) target is not well configured, the UE may be informed and provisioned by the NW during a CSFB procedure with the information to return to LTE. Having this information, the UE may perform an autonomous search of LTE cells after the CSFB call release, speeding up return to LTE. To minimize potential call failures during CSFB, the UE may autonomously perform an additional cell search, in particular a search for cells on a RAT different from the initial target RAT. This creates an opportunity to prevent call failure of CSFB calls that would otherwise fail. The UE may be provisioned during the CSFB procedure with information to perform the additional cell search, should such a search be necessary.

16 Claims, 9 Drawing Sheets

(51) Int. Cl.
  *H04W 76/04*  (2009.01)
  *H04W 48/16*  (2009.01)
  *H04W 36/14*  (2009.01)
  *H04W 48/18*  (2009.01)
  *H04W 88/06*  (2009.01)

(52) U.S. Cl.
  CPC ...... *H04W 76/046* (2013.01); *H04W 36/0083* (2013.01); *H04W 48/18* (2013.01); *H04W 88/06* (2013.01)

(58) Field of Classification Search
  USPC .......................................................... 370/331
  See application file for complete search history.

(56) References Cited

U.S. PATENT DOCUMENTS

2014/0247730 A1 9/2014 Thota et al.
2014/0302845 A1 10/2014 Kim et al.

FOREIGN PATENT DOCUMENTS

WO 2014085191 A2 6/2014
WO 2015001387 1/2015

OTHER PUBLICATIONS

"Geran LTE Interworking Issues with Legacy Systems", Research in Motion UK Ltd., Vodafone Group Plc, May 11-15, 2009, 4 pages, 3rd Generation Partnership Project, Shenzhen, P.R. China.

"Reselection to E-UTRAN following CS fallback", Research In Motion UK Limited, Vodafone, AT&T, Feb. 22-26, 2010, 2 pages, San Francisco, USA.

Written Opinion for International Application No. PCT/US2015/039216, dated Aug. 6, 2016, pp. 1-7.

Ericsson, ST-Ericsson, NTT Docomo, TeliaSonera, AT&T, Softbank Mobile, China Unicorn: "Re-direction to EUTRA Issues," 3GPP TSG-RAN WG2 *78, R2-122709, Prague, Czech Republic, May 21-25, 2012, pp. 1-6.

* cited by examiner

```
-- ASN1START

RRCConnectionRelease ::= SEQUENCE {
  rrc-TransactionIdentifier RRC-TransactionIdentifier,
  criticalExtensions CHOICE {
    c1      CHOICE {
      rrcConnectionRelease-r8 RRCConnectionRelease-r8-IEs,
      spare3 NULL, spare2 NULL, spare1 NULL
    },
    criticalExtensionsFuture SEQUENCE {}
  }
}
onCriticalExtension RRCConnectionRelease-v890-IEs OPTIONAL
}
```
CS-Fallback-UE-EUTRAReturn BOOLEAN;
EUTRAReturnPriorityCarrierFreq ARFCN-ValueEUTRA OPTIONAL, -- Need OP

*FIG. 9*

```
-- ASN1START

MobilityFromEUTRACommand ::= SEQUENCE {
  rrc-TransactionIdentifier RRC-TransactionIdentifier,
  criticalExtensions CHOICE {
    c1      CHOICE{
      mobilityFromEUTRACommand-r8 MobilityFromEUTRACommand-r8-IEs,
      mobilityFromEUTRACommand-r9 MobilityFromEUTRACommand-r9-IEs,
      spare2 NULL, spare1 NULL
    },
    criticalExtensionsFuture SEQUENCE {}
  }
}
```
CS-Fallback-UE-EUTRAReturn BOOLEAN;
EUTRAReturnPriorityCarrierFreq ARFCN-ValueEUTRA OPTIONAL, -- Need OP

*FIG. 10*

-- ASN1START

RRCConnectionRelease-r8-IEs ::= SEQUENCE {
  releaseCause ReleaseCause,
  redirectedCarrierInfo RedirectedCarrierInfo OPTIONAL, -- Need ON
  redirectedCarrierInfo2 RedirectedCarrierInfo2 OPTIONAL, -- Need ON
  idleModeMobilityControlInfo IdleModeMobilityControlInfo OPTIONAL, -- Need OP
  nonCriticalExtension RRCConnectionRelease-v890-IEs OPTIONAL
}

RedirectedCarrierInfo2 ::= CHOICE {
  eutra ARFCN-ValueEUTRA,
  geran CarrierFreqsGERAN,
  utra-FDD ARFCN-ValueUTRA,
  utra-TDD ARFCN-ValueUTRA,
  cdma2000-HRPD CarrierFreqCDMA2000,
  cdma2000-1xRTT CarrierFreqCDMA2000,
  ...,
  utra-TDD-r10 CarrierFreqListUTRA-TDD-r10
}

RRCConnectionRelease-v920-IEs ::= SEQUENCE {
  cellInfoList-r9 CHOICE {
    geran-r9 CellInfoListGERAN-r9,
    utra-FDD-r9 CellInfoListUTRA-FDD-r9,
    utra-TDD-r9 CellInfoListUTRA-TDD-r9,
    ...,
    utra-TDD-r10 CellInfoListUTRA-TDD-r10
  }
  cellInfoList2-r9 CHOICE {
    geran-r9 CellInfoListGERAN-r9,
    utra-FDD-r9 CellInfoListUTRA-FDD-r9,
    utra-TDD-r9 CellInfoListUTRA-TDD-r9,
    ...,
    utra-TDD-r10 CellInfoListUTRA-TDD-r10

}         OPTIONAL, -- Cond Redirection
nonCriticalExtension RRCConnectionRelease-v1020-IEs OPTIONAL
}

CS-Fallback-UE-EUTRAReturn BOOLEAN;
EUTRAReturnPriorityCarrierFreq ARFCN-ValueEUTRA OPTIONAL, -- Need OP

*FIG. 11*

PROCEDURES FOR 3GPP CIRCUIT SWITCHED FALLBACK

PRIORITY CLAIM

This application claims benefit of priority of U.S. Provisional Patent Application Ser. No. 62/021,254 titled "Enhanced Procedures for 3GPP Circuit Switched Fallback", filed on Jul. 7, 2014, which is hereby incorporated by reference as though fully and completely set forth herein.

FIELD OF THE INVENTION

The present application relates to wireless communication, and more particularly to enhanced procedures for providing circuit switched fallback among 3GPP wireless communications devices.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) is the technology of choice for the majority of wireless network operators worldwide, providing mobile broadband data and high-speed Internet access to their subscriber base. LTE defines a number of downlink (DL) physical channels, categorized as transport or control channels, to carry information blocks received from the MAC and higher layers. LTE also defines three physical layer channels for the uplink (UL). The LTE standard supports packet switching with its all-IP network. However, voice calls in any of the wireless communication standards, such as GSM (Global Systems for Mobile), UMTS (Universal Mobile Telecommunications System) and CDMA2000 (Code Division Multiple Access 2000) are circuit switched, so with the adoption of LTE, carriers modified their voice call network in order to accommodate LTE.

Three different approaches were taken in ensuring the seamless transmission of both voice calls and data over LTE. One approach is Voice over LTE (VoLTE), which is based on the Internet Protocol Multimedia Subsystem (IMS) network, with specific profiles for control and media planes of voice service on LTE defined by GSMA (GSM Association) in PRD (Products Requirement Document) IR.92. The voice service is delivered as data flows within the LTE data bearer. Consequently, there is no dependency on the legacy Circuit Switched Voice Network (CSVN). In Simultaneous voice and LTE (SVLTE), the mobile device operates simultaneously in the LTE and circuit switched (CS) modes, with the LTE mode providing data services and the CS mode providing the voice service. This is a solution solely based on the device, which does not have special requirements on the network and does not require the deployment of IMS. However, this solution can require expensive phones with high power consumption.

A third approach is referred to as CS fallback (CSFB), according to which LTE provides data services, but when a voice call is initiated or received, communication falls back to the CS domain. Operators may simply upgrade the MSC (Mobile Service Center) instead of deploying the IMS, and therefore, can provide services quickly. However, the disadvantage is longer call setup delay. While VoLTE has been widely accepted as the desired solution for the future, the demand for voice calls today has led LTE carriers to introduce CSFB as a stopgap measure. When placing or receiving a voice call, LTE handsets fall back to 2G or 3G networks for the duration of the call.

In other words, while 3GPP (Third Generation Partnership Project) LTE technology has reached a certain level of maturity, there continues to be innovation in the area of network deployments strategies, the result of which are challenges to the user experience regarding voice calls. Furthermore, existing LTE network deployments continue to expose "corner cases" in which the voice calling user experience is sub-par. CSFB has been launched commercially by multiple MNOs (Mobile Network Operators). Compared to native CS calls, CSFB deployments continue to expose various problems such as additional call setup time, IRAT (Inter-Radio Access Technology) cell re-selection/handover failures and the inefficient return back to E-UTRAN (Evolved Universal Terrestrial Access Network), all of which severely impact user experience.

SUMMARY OF THE INVENTION

Embodiments described herein are directed to an improvement of 3GPP standards that allow UE (User Equipment) autonomous behavior (using network support) to improve CSFB performance. Various embodiments of LTE communications and network (NW) equipment, including UE devices, base stations and/or relay stations, and associated methods described herein facilitate improved CSFB performance during wireless communications, e.g. wireless communications that involve LTE communications and transmissions. Specifically, various embodiments described herein facilitate improved fast return to LTE upon CSFB call release, and a reduction in CSFB call failure.

CSFB still plays an important role in deployed LTE networks. Compared to a native call starting in 2G or 3G CS domains, CSFB has longer call setup times. Increased call setup times can be observed in LTE to UMTS CSFB and LTE to GSM CSFB, for example, especially if the already standardized solutions to optimize the call setup times are not possible to deploy, e.g., due to impact on both GERAN (GSM EDGE Radio Access Network) and E-UTRAN. Some operators have elected not to upgrade their GERAN/UTRAN when deploying E-UTRAN together with CSFB. In these cases, BSS (Base Station Subsystems) and RNS (Radio Network Subsystems) cannot use the Rel-10 Fast Return procedures to send the UE back to E-UTRAN immediately after CSFB call release. As result, the UE behavior after a CSFB call can be unpredictable. The UE can remain in GERAN/UTRAN for a long time with a degraded user experience. Current CSFB deployments also show a significant failure rate of cell reselection/handover on the target RAT (Radio Access Technology) during CSFB procedures, which can cause the call setup process to fail. Since some operators expect that CSFB will continue to play an important role for some time to come, there is interest in reducing the CSFB call setup times and also improving other aspects of CSFB procedures such as the efficient and fast return to E-UTRAN after CSFB triggered call release and resolving abnormal call setup scenarios.

There is room for enhancement or improvement in CSFB procedures for enabling efficient and fast return to E-UTRAN after CSFB triggered call release without introducing enhancements to the A/Iu interface in GERAN/

UTRAN, and addressing and resolving abnormal call setup scenarios. The adopted enhancements may be designed such that they do not affect CSFB for UEs to which the enhancements are not applicable. That is, CSFB enhancements may be designed using existing UE operations.

The significant failure rate of cell reselection/handover on the target RAT during CSFB procedures (which can result in failure of the call setup process) may be caused by non-optimal legacy RAN (Radio Access Network) target cell lists or excessive RF (Radio Frequency) interference on the target RAT. In case of potential call failures during CSFB, the UE can autonomously perform an additional cell search, in particular a search for cells on a RAT different from the initial target RAT. This creates the opportunity to "rescue" CSFB calls that would otherwise fail.

Accordingly, in one set of embodiments, mobile devices, base stations, and/or relay stations may implement a method for improved CSFB operations by using RRC (Radio Resource Control) connection release procedures and/or handover procedures. If the CSFB target RAT is not well configured (e.g. no LTE cells are broadcasting in the original target RAT), the UE may be informed and provisioned by the NW with information during CSFB procedures to return to LTE. Having this information, the UE may perform an autonomous search of LTE cells after the CSFB call release, and thereby speed up return to LTE. For example, under the present standard, ending a CSFB call can result in the UE remaining on the legacy RAT. However, the NW may provide instruction and information via messaging during the CSFB communications that authorizes the UE to perform an autonomous search upon release of the CSFB call, according to the information provided by the NW during the messaging. This prevents the UE from camping out in the legacy RAT upon release of the CSFB call. The additional information and instruction may be transmitted to the UE in an RRC connection release message or a Mobility from EUTRA Command message for improved fast return to LTE from CSFB. In some cases, the network (e.g. base station) may operate to provide instruction for the UE to perform an autonomous search upon the release of the CSFB call, but without the network also providing the UE with the additional (redirection) information. In such instances, the UE may operate to autonomously search upon release of the CSFB call independently, and select a suitable LTE cell (i.e. a suitable cell in EUTRA).

In case of potential call failures during CSFB, the UE may autonomously perform an additional cell search, in particular, a search for cells on a RAT different from the initial target RAT. This creates the opportunity to "rescue" CSFB calls that would otherwise fail. That is, if an original target RAT results in a failed search, additional instruction and information previously provided to the UE may authorize the UE to perform the additional cell search on a different target RAT according to the additional information. The additional information and instruction may be transmitted to the UE in an RRC connection release message for reducing CSFB call failure.

BRIEF DESCRIPTION OF THE DRAWINGS

FIG. 9 shows one example of a code segment for implementing an updated RRC Connection Release message, according to some embodiments;

FIG. 10 shows one example of a code segment for implementing an updated Mobility from EUTRA Command message, according to some embodiments; and FIG. 11 shows one example of a code segment for implementing a further updated RRC Connection Release message, according to some embodiments.

Figure 1:
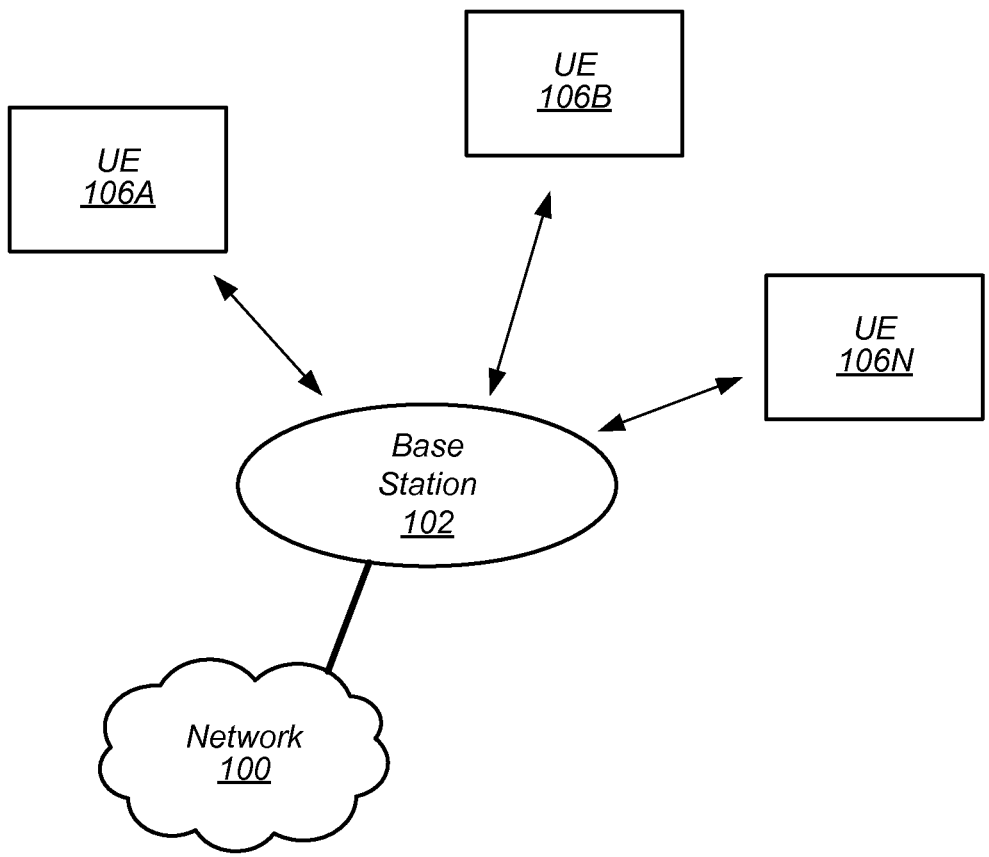
FIG. 1 illustrates an exemplary (and simplified) wireless communication system, in accordance with some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

ACK: Acknowledge
AMR: Adaptive Multi-Rate
ARQ: Automatic Repeat Request (also: Automatic Repeat Query)
BPSK: Binary Phase-Shift Keying
BS: Base Station
BS: Base Station Subsystem
BSR: Buffer Status Report
CCE: Control Channel Elements
CDMA: Code Division Multiple Access
CDRX: Connected-Mode Discontinuous Reception
CFI: Control Frame Indicator
CQI: Channel Quality Indicator
CRC: Cyclic Redundancy Check
CS: Circuit-Switched
CSFB: Circuit-Switched Fallback
CSVN: Circuit-Switched Voice Network
DCI: Downlink Control Information
DL: Downlink (from BS to UE)
DLSCH: Downlink Shared Channel
ENB (or eNB): eNodeB (Base Station)

E-UTRAN: Evolved Universal Terrestrial Access Network
FDD: Frequency Division Duplexing
FEC: Forward Error Correction
GERAN: GSM EDGE Radio Access Network
GPS: Global Positioning System
GSM: Global System for Mobile Communication
HARQ: Hybrid Automatic Repeat Request
IE: Information Element
IMS: Internet Protocol Multimedia Subsystem
LTE: Long Term Evolution
MAC: Media Access Control (layer)
MIMO: Multiple-In Multiple-Out
MME: Mobile Management Entity
MNO: Mobile Network Operator
MSC: Mobile Service Center
MT: Mobile Terminating
MTRF: Mobile Terminating Roaming Forwarding
NACK: Negative Acknowledge
NAS: Non-Access Stratum
NW: Wireless Network
OAM: Operations, Administration, and Management
OFDM: Orthogonal Frequency-Division Multiplexing
PCEF: Policy and Charging Enforcement Function
PCFICH: Physical Control Format Indicator Channel
PDB: Packet Delay Budget
PDCCH: Physical Downlink Control Channel
PDCP: Packet Data Convergence Protocol
PDSCH: Physical Downlink Shared Channel
PDU: Protocol Data Unit
PHICH: Physical HARQ Indicator Channel
PHY: Physical (Layer)
PS: Packet-Switched
PUSCH: Physical Uplink Shared Channel
QCI: Quality of Service Class Identifier
QoS: Quality of Service
QPSK: Quadrature Phase-Shift Keying
RACH: Random Access Procedure
RAT: Radio Access Technology
REG: Resource Element Group
RLC: Radio Link Control
RNC: Radio Network Controller
RNS: Radio Network Subsystems
RNTI: Radio Network Temporary Identifiers
RRC: Radio Resource Control
RSRP: Reference Signal Received Power
RSRQ: Reference Signal Received Quality
RSSI: Reference Signal Strength Indicator
RTP: Real-time Transport Protocol
RX: Reception
SINR: Signal-To-Interference-Plus-Noise Ratio
SRVCC: Single Radio-Voice Call Continuity
SVLTE: Simultaneous Voice and LTE
TB: Transport Blocks
TDD: Time Division Duplexing
TTI: Transmission Time Interval
TX: Transmission
UE: User Equipment
UL: Uplink (from UE to BS)
ULSCH: Uplink Shared Channel
UMTS: Universal Mobile Telecommunication System
VoLTE: Voice over Long Term Evolution Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable electronic devices (e.g. Apple Watch™, Google Glass™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

DCI—refers to downlink control information. There are various DCI formats used in LTE in PDCCH (Physical Downlink Control Channel). The DCI format is a predefined format in which the downlink control information is packed/formed and transmitted in PDCCH.

Figure 2:
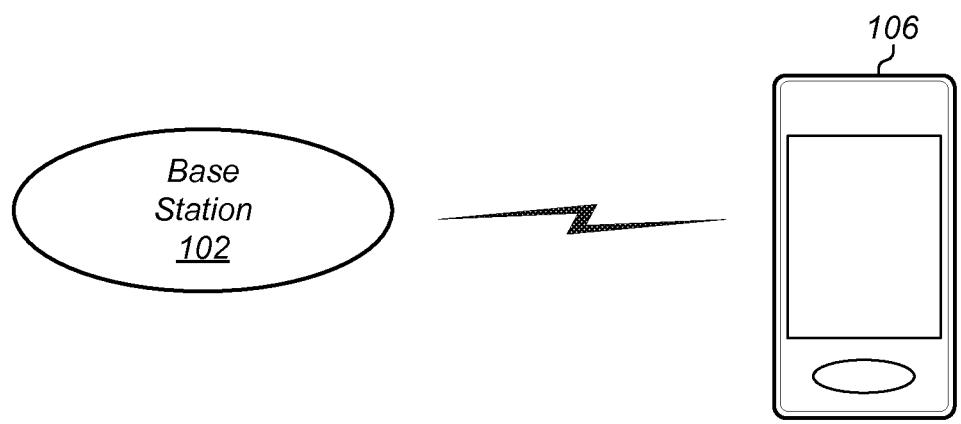
FIG. 2 illustrates one example of a base station in communication with a wireless user equipment (UE) device, in accordance with some embodiments.

FIGS. 1 and 2—Communication System

FIG. 1 illustrates an exemplary (and simplified) wireless communication system, in accordance with some embodiments. It is noted that the system of FIG. 1 is merely one example of a possible system, and embodiments may be implemented in any of various systems, as desired. As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106A-106N are referred to as UEs or UE devices. Furthermore, when referring to an individual UE in general, user devices are also referenced herein as UE 106 or simply UE.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network (NW) insofar as uplink and downlink communications of the UE are concerned. Thus, a UE communicating with one or more base stations in the network (NW) may also be interpreted as the UE communicating with the NW.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to communicate with base station 102 according to improved UL and DL decoupling methods as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLO-NASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102, in accordance with some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments of improved decoding of PCFICH described herein, or any portion of any of the method embodiments of improved decoding of PCFICH described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and Bluetooth. Other configurations are also possible.

Figure 3:
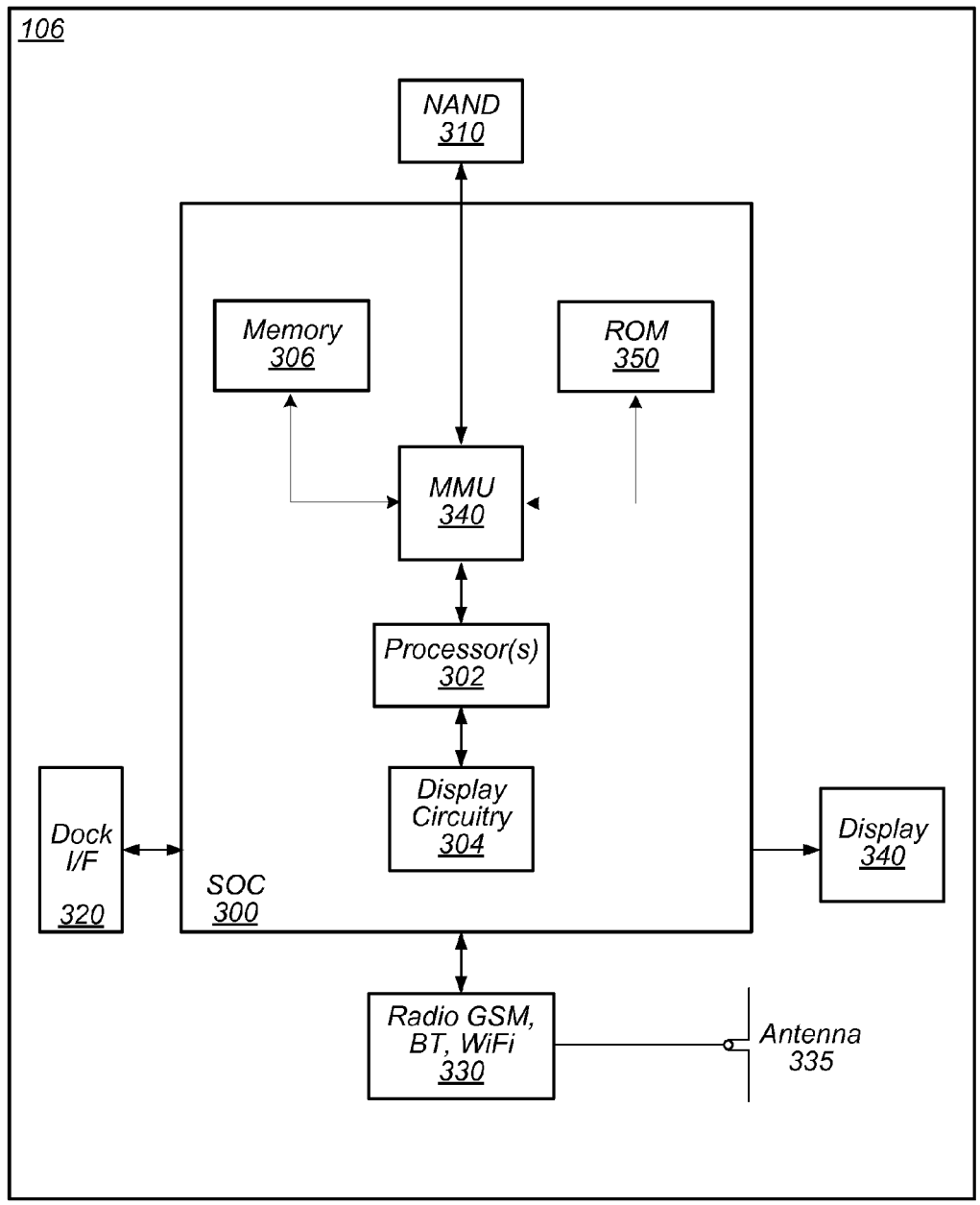
FIG. 3 illustrates an exemplary block diagram of a UE, in accordance with some embodiments.

FIG. 3—Exemplary Block Diagram of a UE

FIG. 3 illustrates an exemplary block diagram of a UE 106, in accordance with some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, LTE-A, CDMA2000, BLUETOOTH™, WiFi™, GPS, etc.). The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described further subsequently herein, the UE 106 (and base station 102) may include hardware and software components for implementing a method for improved CSFB handling. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Furthermore, processor 302 may be coupled to and/or may interoperate with other components as shown in FIG. 3, to implement improved CSFB handling according to various embodiments disclosed herein.

Figure 4:
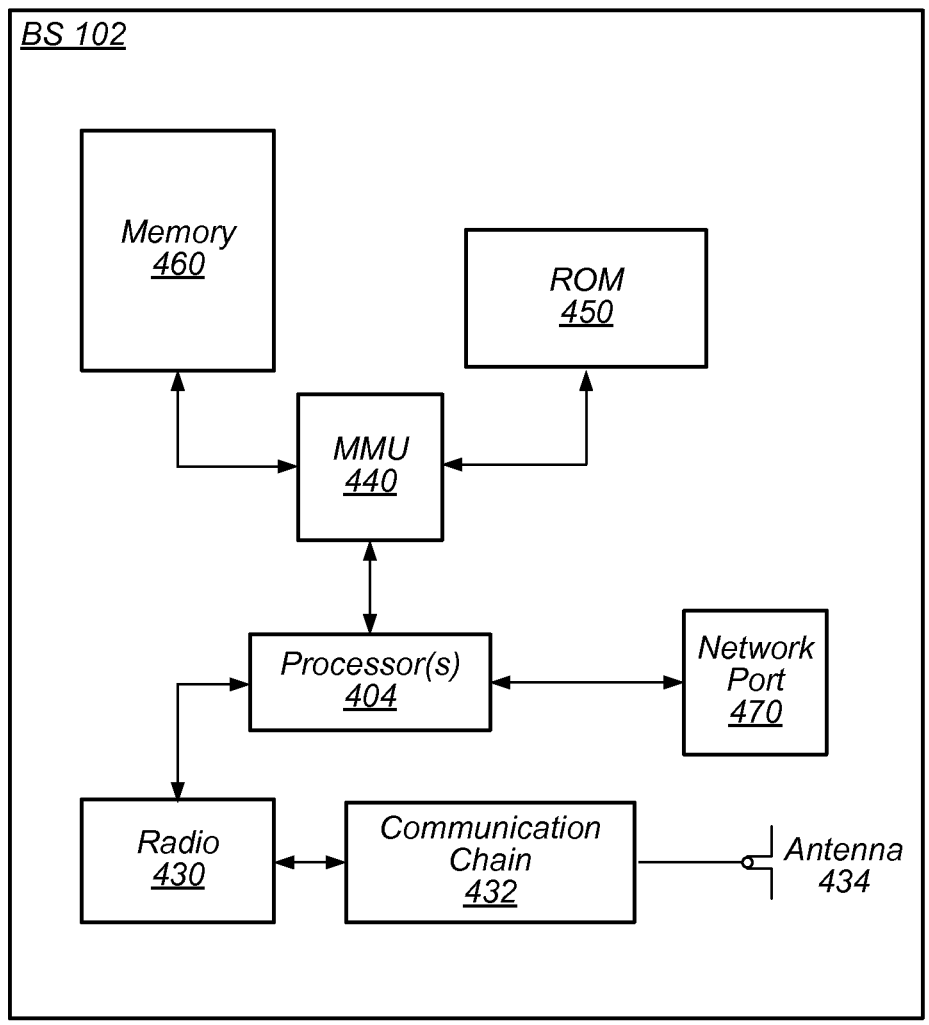
FIG. 4 illustrates an exemplary block diagram of a base station, in accordance with some embodiments.

FIG. 4—Exemplary Block Diagram of a Base Station

FIG. 4 illustrates an exemplary block diagram of a base station 102, in accordance with some embodiments. It is noted that the base station of FIG. 4 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A WCDMA, CDMA2000, etc. The processor 404 of the base station 102 may be configured to implement part or all of the methods described herein for improved CSFB handling, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 5:
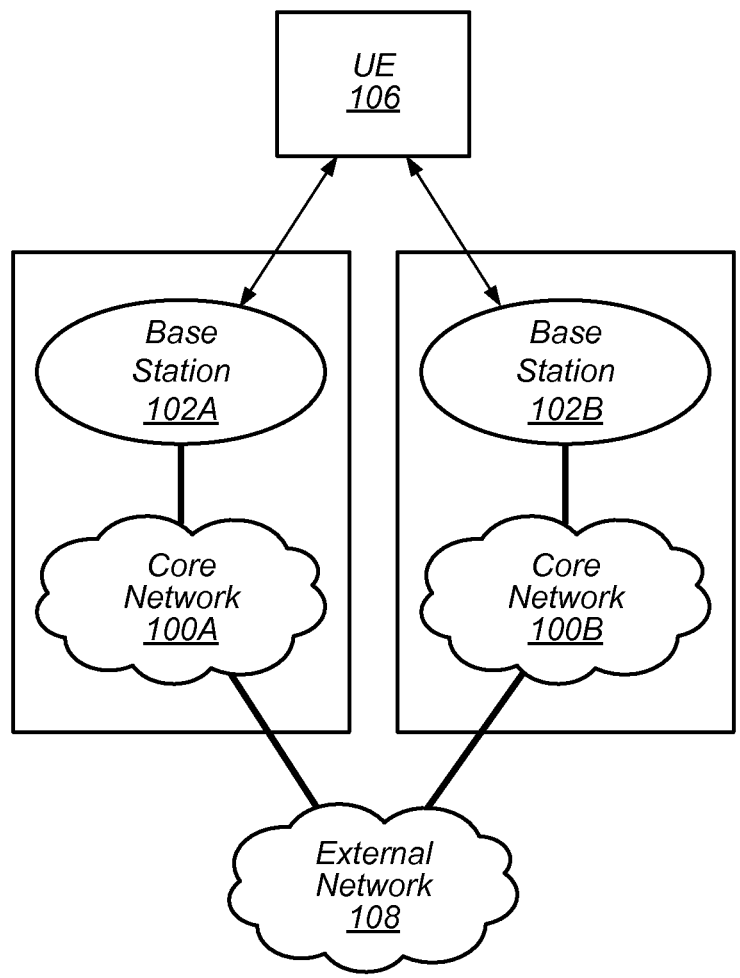
FIG. 5 is an exemplary block diagram of a cellular communication network, in accordance with some embodiments.

FIG. 5—Communication System

FIG. 5 illustrates an exemplary (and simplified) wireless communication system, in accordance with some embodiments. It is noted that the system of FIG. 5 is merely one example of a possible system, and embodiments may be implemented in any of various systems, as desired.

As shown, the exemplary wireless communication system includes base stations 102A and 102B which communicate over a transmission medium with one or more user equipment (UE) devices, represented as UE 106. The base stations 102 may be base transceiver stations (BTS) or cell sites, and may include hardware that enables wireless communication with the UE 106. Each base station 102 may also be equipped to communicate with a core network 100. For example, base station 102A may be coupled to core network 100A, while base station 102B may be coupled to core network 100B. Each core network may be operated by a respective cellular service provider, or the plurality of core networks 100A may be operated by the same cellular service provider. Each core network 100 may also be coupled to one or more external networks (such as external network 108), which may include the Internet, a Public Switched Telephone Network (PSTN), and/or any other network. Thus, the base stations 102 may facilitate communication between the UE devices 106 and/or between the UE devices 106 and the networks 100A, 100B, and 108.

The base stations 102 and the UEs 106 may be configured to communicate over the transmission medium using any of various radio access technologies ("RATs", also referred to as wireless communication technologies or telecommunication standards), such as GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Base station 102A and core network 100A may operate according to a first RAT (e.g., LTE) while base station 102B and core network 100B may operate according to a second (e.g., different) RAT (e.g., GSM, CDMA 2000 or other legacy or circuit switched technologies). The two networks may be controlled by the same network operator (e.g., cellular service provider or "carrier"), or by different network operators, as desired. In addition, the two networks may be operated independently of one another (e.g., if they operate according to different RATs), or may be operated in a somewhat coupled or tightly coupled manner.

Note also that while two different networks may be used to support two different RATs, such as illustrated in the exemplary network configuration shown in FIG. 5, other network configurations implementing multiple RATs are also possible. As one example, base stations 102A and 102B might operate according to different RATs but couple to the same core network. As another example, multi-mode base stations capable of simultaneously supporting different RATs (e.g., LTE and GSM, LTE and CDMA2000 1×RTT, and/or any other combination of RATs) might be coupled to a core network that also supports the different cellular communication technologies. In one embodiment, the UE 106 may be configured to use a first RAT that is a packet-switched technology (e.g., LTE) and a second RAT that is a circuit-switched technology (e.g., GSM or 1×RTT).

As discussed above, UE 106 may be capable of communicating using multiple RATs, such as those within 3GPP, 3GPP2, or any desired cellular standards. The UE 106 might also be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of network communication standards are also possible.

Base stations 102A and 102B and other base stations operating according to the same or different RATs or cellular communication standards may thus be provided as a network of cells, which may provide continuous or nearly continuous overlapping service to UE 106 and similar devices over a wide geographic area via one or more radio access technologies (RATs).

Figure 6:
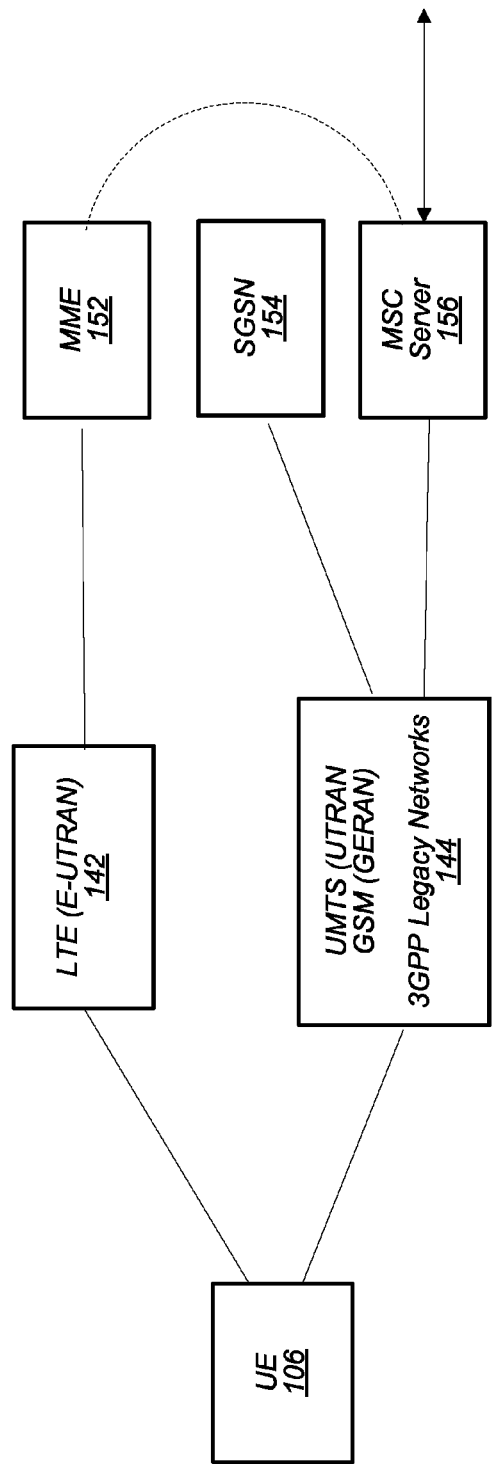
FIG. 6 is a more detailed block diagram of one example of a cellular communication network that includes both an LTE and a 3GPP network, in accordance with some embodiments.

FIG. 6—Communication Scenario with CSFB

FIG. 6 illustrates a more detailed example of a communication scenario that may involve circuit-switched fallback, in accordance with some embodiments. More particularly, FIG. 6 shows a simplified view of an example network architecture with parallel LTE and 2G/3G networks. As shown, the LTE network 142 and the legacy 2G/3G network 144 may co-exist in the same geographic area, wherein both networks reside between the User Equipment (UE) and the common core network. The common core network may comprise an MME (Mobility management Entity) 152, an SGSN (Serving GPRS Support Node) 154, and an MSC (Mobile Switching Center) Server 156. GPRS refers to the General Packet Radio Service, which is a packet oriented mobile data service on 2G and 3G GSM (Global System for Mobile communications) networks.

The MME 152 operates to serve UEs while communicating using LTE. The SGSN 154 operates to serve UEs when they are communicating utilizing data services using 2G/3G networks. The MSC Server 156 operates to serve UEs when utilizing voice services using 2G/3G networks. The MSC Server 156 connects to the carrier's telephony network. The MME 152 connects to the MSC Server 156 to support CS Fallback signaling and SMS transfer for LTE devices.

The interface (SGs) between the MSC Server 156 and the LTE Mobile Management Entity (MME) 152 enables the UE to be both circuit-switched (CS) and packet-switched (PS) registered while on the LTE access network. This interface also enables the delivery of CS pages as well as SMS communications via the LTE access, without the UE having to leave the LTE network.

A CSFB operation generally works as follows. Assume that when a UE is currently communicating with the LTE network, e.g., a default LTE data network connection is in operation, a mobile terminating (incoming) CS voice call arrives at the MSC server 156. This incoming CS voice call triggers a page via LTE to the UE device. This page initiates a CSFB operation. In performing the CSFB operation, the UE sends an extended service request to the network to transition to 2G/3G. Once the UE has transitioned from LTE to 2G/3G, legacy call setup procedures are performed to setup the CS call. Mobile originating (outgoing) calls follow the same transition from LTE (PS) to 2G/3G (CS), except that the paging step is not needed. When a CSFB occurs from LTE to a 3G network, PS data sessions can also move to the 3G network for simultaneous voice and data services. When a CSFB occurs from LTE to a 2G network, PS data sessions may be suspended until the voice call ends and the device returns to LTE, unless the 2G network supports dual transfer mode (DTM), which permits simultaneous voice and data. When the voice call ends, the UE device returns to LTE via idle mode or connected mode mobility procedures.

As described above, when an incoming call arrives and the UE device is paged via LTE, or when the UE initiates an outgoing call, the UE device switches from LTE to 2G/3G. Acquisition of the 2G/3G network and setup of the call can employ either of two procedures, these being handover or redirection. In the handover procedure, the target cell is selected by the network and prepared in advance, and the UE can enter this cell directly in connected mode. While still in LTE, Inter-Radio Access Technology (IRAT) measurements of signal strength measurements may be performed prior to making the handover. In the redirection procedure, the target cell is not preselected for the UE, but rather the UE is only provided with the target frequency. The UE is then allowed to select any cell on the indicated frequency. The UE may also try other frequencies/RATs if no cell can be found on the target frequency. Once a cell is found by the UE, the UE initiates normal call setup procedures. Unlike handover, IRAT measurements of signal strength are not needed prior to redirection. Accordingly, CSFB performed using redirection may require less time to identify the best cell as compared to the handover procedure.

Improved CSFB

As previously mentioned, when compared to native CS calls, CSFB deployments continue to expose various problems such as additional call setup time, IRAT cell re-selection/handover failures and the inefficient return back to E-UTRAN, all of which severely impact the user experience. As a result of business considerations and other factors, some MNOs have elected not to upgrade their GERAN/UTRAN when deploying E-UTRAN together with CSFB. While economically efficient, this means that— GERAN/UTRAN networks have no knowledge of E-UTRAN cells. In practice, GERAN/UTRAN networks do not broadcast neighboring E-UTRAN cell information in the system information messages. In other words, 2G and 3G networks do not currently broadcast neighboring LTE cell information, for example. BSS and RNS cannot use the Rel-10 Fast Return procedures to send the UE back to E-UTRAN immediately after CSFB call release. As result, the behavior of a UE after a CSFB call can become unpredictable. For example, the UE may remain on the GERAN/UTRAN network for a long time (stay camped in the GERAN/UTRAN network) with a degraded user experience. Causes for the call setup process failures may include a non-optimal legacy RAN target cell list or excessive RF interference on the target RAT.

In order to improve CSFB procedures, in case of potential call failures during CSFB the UE may be authorized to autonomously perform an additional cell search, in particular, a search for cells on a RAT different from the initial target RAT, creating an opportunity to "rescue" CSFB calls that would otherwise fail. Furthermore, the fast return of a UE to LTE may also be similarly improved. The CSFB improvements may be achieved through the NW using both RRC connection release procedures and/or handover procedures. If the CSFB RAT target is not well configured (i.e., no LTE cells broadcast on this RAT), the UE may be informed and provisioned with necessary information by the NW (e.g. the base station) during a CSFB procedure to return to LTE upon the CSFB call release. Having this information may allow the UE to perform autonomous search of LTE cells after the CSFB call release, and speed up the return to LTE. In effect, this provides enhancements for shortening CSFB call setup time. It also provides efficient and fast return to E-UTRAN after a CSFB triggered call release without introducing enhancements to the A/Iu interface in GERAN/UTRAN.

Improved CSFB by Using the RRC Connection Release Message

In one set of embodiments, the fast return to LTE CSFB may be improved through the use of the RRCConnectionRelease (RRC connection release) message. The RRC protocol belongs to the E-UTRAN and UMTS WCDMA (Wideband CDMA) protocol stack and handles the control plane signaling of Layer 3 between the UE and E-UTRAN/UTRAN. It presently includes functions for connection establishment and release, broadcast of system information, radio bearer establishment/reconfiguration and release, RRC connection mobility procedures, paging notification and release, and outer loop power control. There is one RRC connection open to a UE at any one time. The RRC connection release message is used to command the release of an RRC connection. E-UTRAN initiates the RRC connection release procedure to a UE in RRC_CONNECTED state. The RRC connection release procedure may also be used with redirection information for CS-fallback to GERAN or UTRAN.

At least two new fields may be included in the RRCConnectionRelease message to improve UE fast return to LTE CSFB. By providing additional information (that would otherwise not be available to the UE) in the new fields, the NW (e.g. base station) may authorize the UE to more efficiently return to LTE upon completion of a CSFB call, for example.

A first new field may be CS-Fallback-UE-EUTRAReturn, a BOOLEAN expression that indicates to the UE (e.g. UE 106) that the UE is authorized to perform autonomous LTE NW search after CSFB call release.

A second new field may be EUTRAReturnPriorityCarrierFreq, which may be present when "CS-Fallback-UE-EUTRAReturn" is set to "TRUE". It may contain a priority list of EARFCNs (EUTRA Absolute Radio Frequency Channels) to use by the UE when the CSFB call is released.

The expected behavior of the UE and NW, respectively, when the new fields are received in an RRC connection release message may be as follows. The UE may immediately begin LTE cell search upon return to idle after a CSFB call. If the value of CS-Fallback-UE-EUTRAReturn is FALSE, then the UE does not begin LTE cell search upon return to idle after a CSFB call, even if LTE neighboring cell information is received during radio resource connection release on the target RAT. If the CS-Fallback-UE-EUTRAReturn Information Element (IE) is absent, then the UE may operate according to legacy behavior. Upon receipt of the EUTRAReturnPriorityCarrierFreq IE, the UE may be expected, upon return to LTE, to search for cells on the listed EARFCNs in priority order.

RRC Connection Release Update

Based at least on the proposed new fields described above, an RRCConnectionRelease message may be updated as shown in FIG. 9. The proposed changes are in bold and underlined in the exemplary code segment shown in FIG. 9.

Improved CSFB by Using Handover Procedures

UE fast return to LTE from a CSFB call may also be improved using handover procedures. The E-UTRAN initiates the mobility from E-UTRA procedure to a UE in RRC_CONNECTED mode, possibly in response to reception of a CS fallback indication for the UE from MME, by sending a MobilityFromEUTRACommand (Mobility from EUTRA command) message. The base station may send a Mobility from EUTRA command message possibly in response to a "Measurement Report" message from the UE, or, as mentioned above, in response to reception of "CS fallback indication" for the UE from the MME. As also previously mentioned, the purpose of this procedure is to move a UE from E-UTRAN to a cell using another RAT, e.g. GERAN, UTRA or CDMA2000 systems. At least two new fields may be included in the MobilityFromEUTRACommand message to improve UE fast return to LTE from a CSFB call. The new fields and their respective functionality and purpose are similar to the fields proposed above for the RRCConnectionRelease message.

A first new field may be CS-Fallback-UE-EUTRAReturn, a BOOLEAN expression that indicates to the UE that the UE is authorized to perform autonomous LTE NW search after CSFB call release.

A second new field may be EUTRAReturnPriorityCarrierFreq, which may be present when "CS-Fallback-UE-EUTRAReturn" is set to "TRUE". It may include a priority list of EARFCN to use by the UE when the CSFB call is released.

The behavior of the UE and NW (e.g. base station), respectively, when new these new fields are received in the MobilityFromEUTRACommand, may be characterized as follows. The UE may immediately begin LTE cell search upon return to idle after a CSFB call. If the value of CS-Fallback-UE-EUTRAReturn is FALSE, then the UE may forego the LTE cell search upon return to idle after a CSFB call even if LTE neighboring cell information is received during radio resource connection release on the target RAT. If the CS-Fallback-UE-EUTRAReturn IE is absent, then legacy UE behavior may govern. Upon receipt of the EUTRAReturnPriorityCarrierFreq IE, the UE may, upon return to LTE, search for cells on the listed EARFCNs in priority order.

Mobility from EUTRA Command Update

Based at least one the proposed new fields described above, the MobilityFromEUTRACommand message may be updated as shown in FIG. 10. The proposed changes are in bold and underlined in the exemplary code segment shown in FIG. 10.

Improved UE CSFB Operations that Reduce Call Failure

In order to maximize the call setup success rate in the context of failed cell search on the target RAT during CSFB calls, another feature may be implemented. More specifically, in addition to the two new fields added in the RRC-ConnectionRelease message in order to improve fast return to LTE, two additional fields may be included in order to improve the CSFB call success rate. Accordingly, a new list in the RRCConnectionRelease message may also contain the RAT and cell information to be used by the UE during CSFB in case the cell search according to cellInfoList fails. Specifically, an optional IE, named redirectedCarrierInfo2 and having a corresponding list cellInfoList2, may be added to the RRCConnectionRelease message. RedirectedCarrierInfo2 may indicate a second carrier frequency (possibly corresponding to a second RAT) to be used for CSFB, with the new list cellInfoList2 having a structure identical to cellInfoList.

RRC Connection Release Update

Based at least the proposed new fields described above, the RRCConnectionRelease message may be further updated as follows. The proposed changes are in bold and underlined in the exemplary code section shown in FIG. 11. As shown in FIG. 11, the (exemplary) code segment includes the additional information for fast return to LTE. Thus, the exemplary code section shown in FIG. 11 includes all four proposed additional fields:

RedirectedCarrierInfo2
cellInfoList2
CS-Fallback-UE-EUTRAReturn
EUTRAReturnPriorityCarrierFreq.

Various methods for improved CSFB performance may be implemented based at least in part on the proposed new fields as described above. To put it another way, the principles described above with respect to the new fields for existing signaling may be extended to various methods for providing improved performance when handing over communications between respective networks operating according to different RATs. While examples of various updated commands and signaling were provided above with respect to specific RATs (e.g. LTE), numerous embodiments may similarly be implemented for wireless networks operating according to different RATs than those exemplified above.

Figure 7:
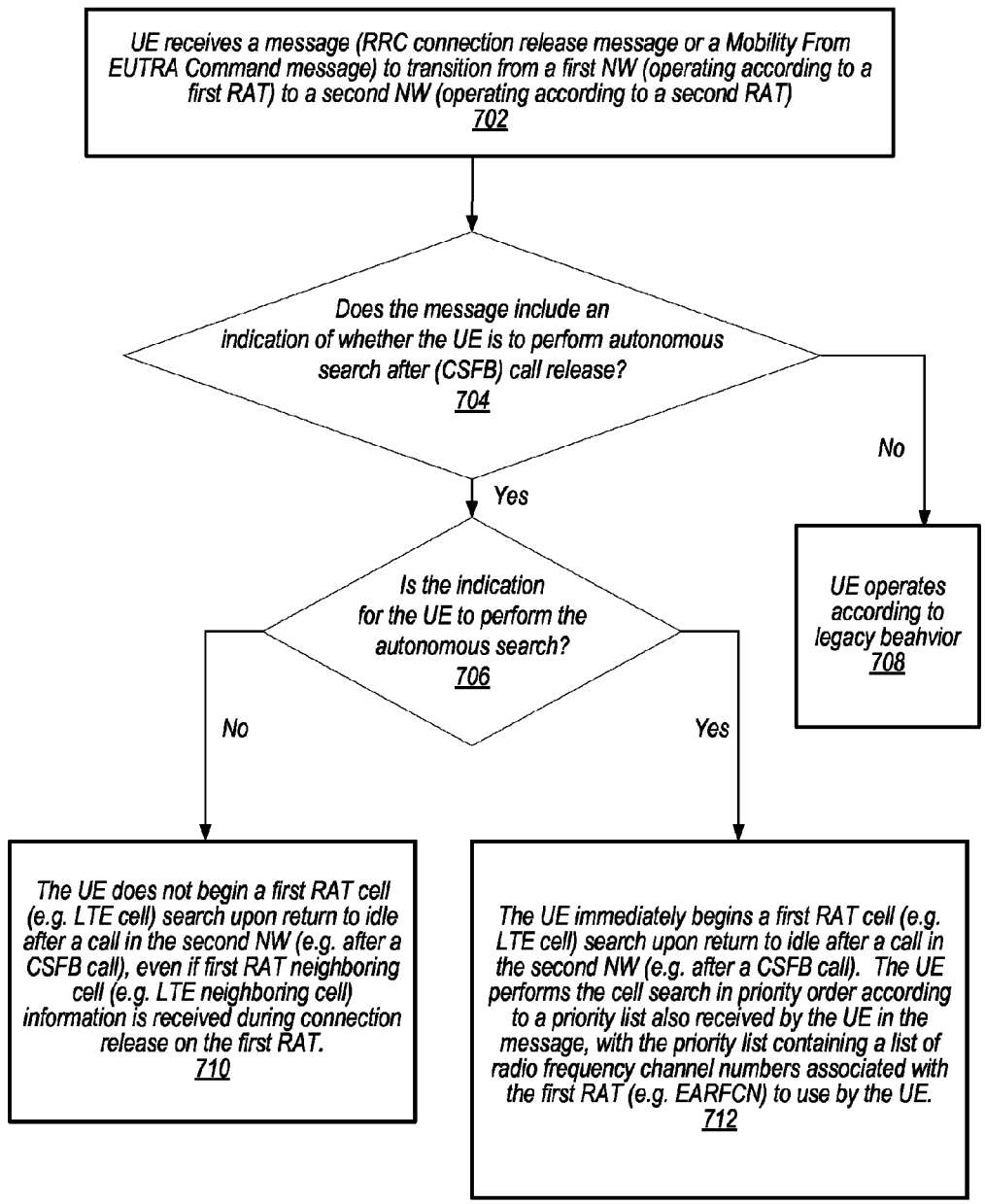
FIG. 7 is a flowchart diagram illustrating one example of a method for providing improved return to LTE during CSFB operations, according to one set of embodiments.

FIG. 7 shows a flowchart diagram illustrating one example of a method for providing improved handover between NWs operating according to different RATs, e.g. improved return to LTE during CSFB operations, according to some embodiments. In general, the flow diagram in FIG. 7 illustrates one exemplary method for returning to a first NW operating according to a first RAT upon completion of a voice call in a second NW operating according to a second RAT. As shown in FIG. 7, a wireless device, e.g. a UE may receive a message for transitioning from the first NW to the second network (702). In case the first NW is an LTE NW and the second NW is a CS NW, the message may be an RRC connection release message or a "Mobility from EUTRA" Command message. The message may be transmitted by a base station or a relay station operating in the first NW. The UE may determine if the message includes an indication of whether the UE is to perform autonomous search after (CSFB) call release (704). In other words, the UE may determine whether the message includes an indication pertaining to whether the UE may or may not perform autonomous search for a network operating according to the first RAT upon completion of a call conducted by the UE in the second NW (operating according to the second RAT).

In case the message does not include such an indication, the UE may continue to operate according to legacy behavior (708). That is, the UE may continue to operate according to the established communications protocol without additional consideration for the UE performing autonomous searches. However, if it is determined (by the UE) that the message includes such an indication, then the UE may determine whether the indication is for the UE to perform the autonomous search (706). If the indication is for the UE to perform the autonomous search, the UE may immediately begin a first RAT cell search, e.g. an LTE cell search, upon return to idle after having conducted a call in the second NW, e.g. upon return to idle after a CSFB call (712). The UE may perform the cell search in priority order according to a priority list also received by the UE in the message, with the priority list containing a list of radio frequency channel numbers associated with the first RAT (e.g. EARFCN) to use by the UE (712). In case the indication is for the UE to not perform the autonomous search, the UE does not begin the first RAT cell (e.g. LTE cell) search upon return to idle after a call in the second NW, e.g. after a CSFB call, even if first RAT neighboring cell information, e.g. LTE neighboring cell information, is received during release on the first RAT (710).

Figure 8:
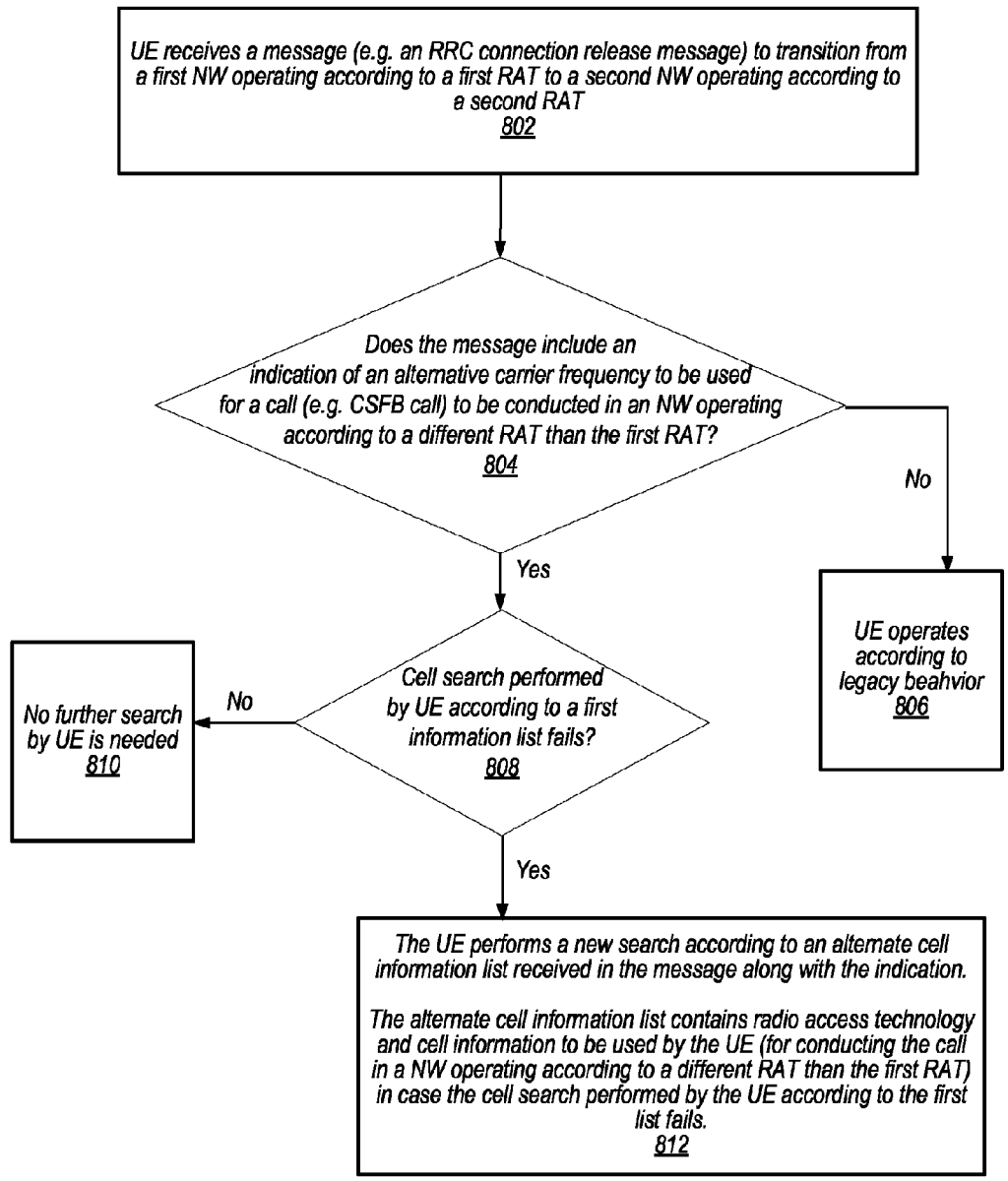
FIG. 8 is a flowchart diagram illustrating one example of a method for providing reduced call failure during CSFB operations, according to one set of embodiments.

FIG. 8 is a flowchart diagram illustrating a method for providing reduced call failure during CSFB operations. In general, the flow diagram in FIG. 8 illustrates one example of a method for reducing call failure when transitioning from a first NW operating according to a first RAT to a second NW operating according to a second RAT, for example while conducting a voice call. As shown in FIG. 8, a UE may receive a message to transition from the first NW to the second NW (802). The message may be an RRC connection release message sent by a base station operating in the first NW, for example. The UE may determine whether the message includes an indication of an alternative carrier frequency to be used for a call (e.g. for a CSFB call) to be conducted in an NW operating according to a different RAT than the first RAT (804). That is, the UE may determine whether the message includes an indication for the UE to perform a cell search according to alternative RAT and cell information in case a search performed by the UE according to a first list that includes information about the second RAT and cell has failed.

In case the message does not include such an indication, the UE may continue to operate according to legacy behavior (806). That is, the UE may continue to operate according to the established communications protocols without additional consideration for the UE to perform a cell search according to an alternative RAT (to the second RAT). If the message includes such an indication, and a cell search performed by the UE according to the first information list has failed (808), the UE may perform a new search according to a new cell information list also received in the message along with the indication (812). The new cell information list may contain radio access technology and cell information to be used by the UE during CSFB if a cell search performed by the UE according to the original list has failed (812). In case the message includes the indication of an alternative carrier frequency to be used for CSFB but the cell search performed by the UE according to the original information list has not failed, no further search may be performed by the UE (810).

For example, the message may include a first information list that includes RAT and cell information associated with 2G networks for performing CSFB operations (from an LTE network) to conduct a voice call over a 2G network. However, the message may also include an indication of an alternate carrier frequency and associated second information list that includes RAT and cell information associated with 3G networks for performing CSFB operations (from the LTE network) to conduct a voice call over a 3G network.

In case the cell search performed by the UE based on the first information list fails, the presence of the indication authorizes the UE to perform a second search according to the second information list, thereby increasing the chances of the CSFB call succeeding, by widening the overall number of possible target cells.

Additional Embodiments

In various embodiments, a method for a wireless UE device to transition between an NW operating according to a first RAT and a NW operating according to a different RAT from the first RAT may include:

receiving, by the UE, an alternate list containing RAT and cell information to be used by the UE during CSFB to the new NW in case of an unsuccessful cell search performed by the UE according to an original list, and performing, by the UE, a cell search according to the RAT and cell information contained in the alternate list, responsive to the unsuccessful cell search.

In some embodiments, receiving the new list may include receiving the new list in a RRC connection release message. The method may also include receiving, by the UE, an indication of a second carrier frequency to be used for CSFB, where the RAT and cell information contained in the new list corresponds to the second carrier frequency.

In some embodiments, a wireless UE performing CSFB operations may include:

a radio including one or more antennas for performing wireless communications a processor, and a memory medium storing program instructions executable by the processor to cause the UE to receive a new list containing RAT and cell information to be used by the UE during circuit switched fallback in case of an unsuccessful cell search performed by the UE according to an original list, and further to cause the UE to perform a cell search according to the RAT and cell information contained in the new list, responsive to the unsuccessful cell search.

The program instructions may also be executable by the processor to cause the UE to receive an indication of a second carrier frequency to be used for CSFB, where the RAT and cell information contained in the new list corresponds to the second carrier frequency.

In one set of embodiments, a non-transitory computer accessible memory medium may store program instructions for a wireless UE device to perform wireless communications. The program instructions may be executable to cause the UE to receive a new list containing RAT and cell information to be used by the UE during circuit switched fallback in case of an unsuccessful cell search performed by the UE according to an original list, and may further cause the UE to perform a cell search according to the RAT and cell information contained in the new list, responsive to the unsuccessful cell search. The program instructions may be further executable to cause the UE to receive an indication of a second carrier frequency to be used for CSFB, where the RAT and cell information contained in the new list corresponds to the second carrier frequency.

In yet another set of embodiments, the program instructions may be executable to cause the UE to receive an indication of whether the UE is to perform, subsequent to a CSFB call release, autonomous network search for a network of a second RAT, and may further cause the UE to perform the autonomous network search for a network of a second RAT responsive to the indication instructing the UE to perform the autonomous network search. The program instructions may also be executable to cause the UE to remain idle, responsive to the indication instructing the UE to not perform the autonomous network search. The program instructions may be further executable to cause the UE to receive, along with the indication, a priority list of radio frequency channels to use by the UE, upon the CSFB call release, to perform the autonomous network search for a network of a second RAT responsive to the indication instructing the UE to perform the autonomous network search.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for a wireless user equipment device (UE) to transition from communicating on a network operating according to a first radio access technology (RAT) to communicating on a network operating according to a second RAT, the method comprising:

receiving, by the UE, in a radio resource control (RRC) connection release message when in a connected state on a second network operating according to the second RAT, an indication of whether the UE is to perform, upon call release of a first voice call conducted by the UE in a first network operating according to a first RAT subsequent to the UE disconnecting from the second network at least in response to receiving the RRC connection release message, an autonomous network search for a network operating according to the second RAT;

performing, by the UE, one of:

the autonomous network search, in response to the indication instructing the UE to perform the autonomous network search, for a network operating according to the second RAT; and remaining idle, in response to the indication instructing the UE to not perform the autonomous network search.

2. The method of claim 1, further comprising:
receiving, by the UE, along with the indication, a priority list of radio frequency channels usable by the UE, upon the call release, to perform the autonomous network search for a network operating according to the second RAT, in response to the indication instructing the UE to perform the autonomous network search.

3. The method of claim 1, further comprising:
receiving, by the UE, an alternate list containing alternate RAT and cell information usable by the UE to automatically and autonomously perform additional cell search in case a first cell search performed by the UE according to an original list containing original RAT and cell information is unsuccessful;
wherein the first cell search and the additional cell search are both for establishing a second voice call in a network operating according to a RAT different from the second RAT.

4. The method of claim 1, further comprising:
establishing, by the UE, communications in a network operating according to the second RAT, in response to the autonomous network search performed by the UE being successful.

5. The method of claim 1, further comprising:
receiving, by the UE, an indication of whether the UE is to autonomously perform additional cell search in case a first cell search performed by the UE according to an original list containing original RAT and cell information is unsuccessful;
wherein the first cell search and the additional cell search are both for establishing a second voice call in a network operating according to a RAT different from the second RAT.

6. The method of claim 1, wherein the first network is a circuit switched network, and wherein the second network is a packet switched network.

7. A wireless user equipment device (UE) comprising:
a radio, comprising one or more antennas for performing wireless communications;
a processor; and
a non-volatile memory device storing program instructions executable by the processor to cause the UE to:
receive, in a radio resource control (RRC) connection release message when in a connected state on a first data packet network, an indication of whether the UE is to perform, upon the UE completing a voice call conducted in a first circuit switched network subsequent to the UE disconnecting from the first data packet network at least in response to receiving the RRC connection release message, an autonomous network search for a data packet network; and
receive a priority list of radio frequency channels usable by the UE when performing the autonomous network search for a data packet network in response to the indication instructing the UE to perform the autonomous network search.

8. The UE of claim 7, wherein the program instructions are further executable by the processor to cause the UE to:
perform the autonomous network search for a data packet network according to the priority list upon the UE completing the voice call, in response to the indication instructing the UE to perform the autonomous network search.

9. The UE of claim 8, wherein the program instructions are further executable by the processor to cause the UE to:
establish communications with the data packet network, in response to the UE successfully completing the autonomous network search.

10. The UE of claim 7, wherein the program instructions are further executable by the processor to cause the UE to:
remain idle, in response to the indication instructing the UE to not perform the autonomous network search.

11. The UE of claim 7, wherein the program instructions are further executable by the processor to cause the UE to:
receive an indication of whether the UE is to autonomously perform additional cell search in case a first cell search performed by the UE according to an original list containing original RAT and cell information is unsuccessful;
wherein the first cell search and the additional cell search are for establishing a second voice call in a circuit switched network.

12. The UE of claim 11, wherein the program instructions are further executable by the processor to cause the UE to:
receive an alternate list containing alternate RAT and cell information usable by the UE when performing the additional cell search.

13. The UE of claim 11, wherein the program instructions are further executable by the processor to cause the UE to:
perform the additional cell search in response to the indication instructing the UE to perform the additional cell search in case the first cell search performed by the UE is unsuccessful.

14. A base station, comprising:
a radio, comprising one or more antennas for the base station to perform wireless communications according to a first radio access technology (RAT);
a processor; and
a non-volatile memory device storing program instructions executable by the processor to cause the base station to:
transmit, to a wireless user equipment device (UE) connected in a first network operating according to the first RAT, in a radio resource control, RRC, connection release message, an indication of whether the UE is to perform, upon a circuit switched fallback (CSFB) call release of a CSFB call conducted by the UE in a second network operating according to a second RAT subsequent to the UE disconnecting from the first network at least in response to receiving the RRC connection release message, an autonomous network search for a network operating according to the first RAT;
wherein, the indication is configured to assist the UE in determining whether to perform the autonomous network search upon completion of the CSFB call.

15. The base station of claim 14, wherein the program instructions are further executable by the processor to cause the base station to:
transmit, along with the indication, a priority list of radio frequency channels, wherein the priority list is configured to assist the UE in identifying which radio frequency channels to search for when performing the autonomous search upon completion of the CSFB call, in response to the indication instructing the UE device to perform the autonomous search.

16. The base station of claim 14, wherein the program instructions are further executable by the processor to cause the base station to:

transmit, to the UE, an alternate list containing alternate RAT and cell information configured to assist the UE in automatically and autonomously performing additional cell search for establishing a second CSFB call, in case a first cell search performed by the UE for establishing the second CSFB call according to an original list containing original RAT and cell information is unsuccessful.

* * * * *